May 27, 1969

J. D. GINER 3,446,672

METHOD AND APPARATUS FOR CONVERTING HYDROGEN-CONTAINING FEEDSTOCKS INTO ELECTRICAL ENERGY

Filed July 7, 1965

INVENTOR.
JOSÉ D. GINER

BY
Charles F. Warren
ATTORNEY

May 27, 1969

J. D. GINER  3,446,672
METHOD AND APPARATUS FOR CONVERTING HYDROGEN-CONTAINING
FEEDSTOCKS INTO ELECTRICAL ENERGY

Filed July 7, 1965

INVENTOR.
JOSÉ D. GINER

BY
Charles A. Warren
ATTORNEY

United States Patent Office

3,446,672
Patented May 27, 1969

3,446,672
METHOD AND APPARATUS FOR CONVERTING HYDROGEN-CONTAINING FEEDSTOCKS INTO ELECTRICAL ENERGY
José D. Giner, Glastonbury, Conn., assignor to United Aircraft Corporation, East Hartford, Conn., a corporation of Delaware
Filed July 7, 1965, Ser. No. 470,022
Int. Cl. H01m 27/06
U.S. Cl. 136—86     10 Claims

ABSTRACT OF THE DISCLOSURE

There is disclosed an electrochemical converter having a housing with a matrix member therein formed of absorbent, porous material and containing an electrolyte providing an ionic path therethrough. A porous anode having a dehydrogenation catalyst in the pores thereof is firmly pressed against one side of the matrix member and a cathode is firmly pressed against the other side thereof with a power supply being connected therebetween.

---

The present invention relates to the conversion of hydrocarbons and other hydrogen-containing feedstocks to hydrogen, and more particularly to an electrochemical method and apparatus for the conversion of hydrogen-containing feedstocks to hydrogen for use in fuel cells and the like, and to fuel cell assemblies employing the same.

There has been extensive activity in the development of devices for the direct conversion of chemical energy into electrical energy. Generally, an oxidation-reduction reaction occurs in a cell provided with spaced electrodes and an intermediate electrolyte and the electrodes are connected to an external circuit providing an electrical load. In this manner, it is possible to convert electrochemically a major portion of the energy of the chemical reaction between reactants continuously supplied to the electrodes directly into electrical energy for use in the external circuit. Although it has been proposed to utilize other materials as the fuel in such fuel cells, hydrogen has been generally recognized as the preferred reactant or fuel and its coreactant has generally been oxygen, conveniently in air, with the two reactants being supplied respectively to the anode and cathode.

Various techniques have been proposed for continuously generating hydrogen for use in such fuel cells including the electrochemical means disclosed in Rightmire United States Patent No. 3,092,516, and a proposed integrated catalytic conversion suggested in the recently issued Beals United States Patent No. 3,177,097. In addition, high and medium temperature catalytic dehydrogenation processes have also been explored as indicated by the recently published literature.

It is an object of the present invention to provide a novel apparatus for continuously converting hydrogen-containing feedstocks into hydrogen which is operable at relatively low temperatures and which may be readily coupled to a fuel cell.

It is also an object of the present invention to provide a highly compact electrochemical conversion cell for hydrogen-containing feedstocks which may be readily fabricated and is relatively free from operating difficulties.

Another object is to provide a relatively compact and efficient fuel cell assembly having integrated therein a novel electrochemical conversion cell.

Still another object is to provide a method for the rapid and efficient conversion of hydrogen-containing feedstocks to hydrogen either in combination with a direct energy conversion reaction or for producing hydrogen for further purification or storage.

Other objects and advantages will be readily apparent from the following detailed specification and claims and the attached drawings wherein:

Figure 1:
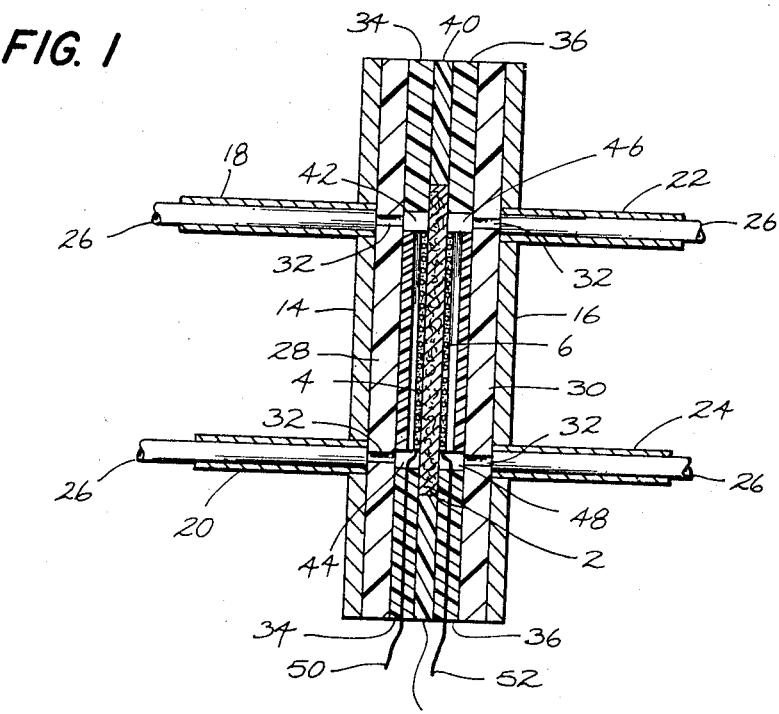
FIGURE 1 is a diagrammatic representation of one form of conversion apparatus embodying the present invention.

It has now been found that the foregoing and related objects may be readily attained by an electrochemical conversion method and apparatus wherein there is provided an absorbent porous matrix member which is presaturated with an electrolyte to provide an ionic path therethrough and an anode firmly pressed against one side of the matrix member which provides a dehydrogenation catalyst for a hydrogen-containing feedstock coming into contact therewith. Firmly pressed against the other side of the matrix member is a cathode which is permeable to hydrogen and which provides a catalyst for adsorption of hydrogen ions from the matrix member and the reduction thereof to atomic hydrogen. A power supply is connected to the anode and cathode and the current flowing therethrough produces conversion of the hydrogen-containing fuel into components including hydrogen ion with the hydrogen ion passing through the matrix member in the electrolyte therein to the cathode where it is adsorbed and accepts electrons to form atomic hydrogen.

The term "hydrogen-containing feedstocks" as used herein refers to hydrogen-containing compounds which may be reacted in the presence of a suitable catalyst and potential to produce hydrogen ions. Exemplary of such compounds are saturated and unsaturated hydrocarbons, alcohols, aldehydes and other organic compounds, and ammonia.

Although various structures may be employed for fabricating the anode and cathode of the converter, a highly advantageous arrangement has been provided by the use of a conductive metal screen which is coated with a suitable catalyst composition to provide the catalyst between the wires. In this manner, the current may be readily conducted throughout, and the structure provides facile flow of the hydrogen ions produced by the dehydrogenation reaction therefrom into the electrolyte at the anode and from the electrolyte into the cathode. To avoid flooding of the electrode by the electrolyte, the screen is desirably treated with a hydrophobic material such as tetrafluoroethylene resin. However, it is readily apparent that other structures may be employed for fabricating the anode, including metal elements, inherently permeable gases such as the porous electrode structure disclosed in Bacon United States Patent No. 2,928,783, or perforated so as to permit passage of gases therethrough. The metal may be inherently catalytic such as palladium and platinum and/or it may have its surface treated or coated so as to impart the desired catalytic activity thereto.

A highly efficient and trouble-free assembly has been provided by the use of the porous absorbent matrix member which may be saturated with the electrolyte prior to assembly thereof with the electrodes to provide a conductive path between the anode and the cathode. Although various materials may be employed for this purpose, mats of inorganic fibers such as quartz and glass which are relatively inert to the flow of current therethrough and to the electrolyte are most desirably employed. These mats may vary in thickness, but desirably fall within the range of 5 to 60 mils, and preferably about 10 to 30 mils in order to provide sufficient electrolyte without excessive resistance. The porosity similarly may vary, but high porosity commensurate with adequate strength and retention is generally advantageous to ensure adequate electrolyte for efficient passage of the hydrogen ions therethrough. Generally, the porosity of the matrices should fall within the range of 30 to 75 percent, and preferably within the range 45 to 65 percent.

To ensure firm conductive contact between such a matrix member and the anode and cathode, pressure plates preferably fabricated of sythetic resin are disposed to apply pressure against the outer surfaces of the anode and cathode and are provided with suitable passages for the gas in contact with the anode and cathode. These passages may be provided by grooves extending continuously along the surface of the plates or by apertures extending therethrough, or combinations thereof depending upon the physical configuration of the assembly employed for the converter.

Various gaseous fuels may be supplied to the converter to produce the desired hydrogen incuding saturated and unsaturated hydrocarbons, oxygenated organics such as alcohols, and ammonia. The electrolyte will, of course, vary with the fuel selected as generally will the nature of the catalysts employed.

The reaction taking place in the converter with a hydrocarbon fuel is readily understood by reference to the following equations:

$$C_2H_6 + 4H_2O \rightarrow 2CO_2 + 14H^+ + 14e^- \text{ (anode)}$$
$$14H^+ + 14e^- \rightarrow 7H_2 \text{ (cathode)}$$

Generally, only a small potential difference is required to produce the desired reaction, for example 180 to 400 millivolts being generally satisfactory, and preferably 200 to 300 millivolts. The current density will, of course, depend upon the potential employed and will vary between about 50 to 150 milliamperes per square centimeter.

It has been found that the converter of the present invention may be included within a fuel cell assembly affording significant advantages in terms of compactness and ease of operation. In such a fuel cell assembly, a pair of electrodes for a conventional fuel cell reaction are spaced to the opposite side of the cathode of the converter and a suitable alkaline electrolyte is provided therebetween. The gas evolved from the cathode of the hydrocarbon electrode assembly of the present invention passes directly into contact with the anode of the fuel cell reaction where it surrenders electrons to form hydrogen ions in the alkaline electrolyte which will react with the hydroxyl ions produced by the reaction of oxygen at the fuel cell anode. The cathode of the fuel cell portion and the anode of the converter portion are coupled through an external circuit providing a load to derive power from the hydrox reactions. A secondary circuit is coupled to the converter cathode to furnish a small amount of current sufficient to compensate for hydrogen loss either from a secondary power source such as a battery or by shunting a portion of the power produced by a multiplicity of cell assemblies connected in series as will be more fully explained hereinafter. The potential required for the hydrocarbon conversion reaction to replace hydrogen loss is far below that generated in the oxidation reaction of the fuel cell so that there is a considerable surplusage which may be used to power the conversion reaction of additional fuel cell assemblies or which may be tapped for operating suitable devices.

If no external power supply is provided between the anode and the cathode of the converter, the inherent electron loss at the hydrocarbon cathode or fuel cell anode caused by consumption of hydrogen by impurities will produce a leak in the electrical circuit and ultimately destroy the system. Since this loss is cumulative, the small external current avoids this deteriorating effect and permits continuous operation over extended periods of time. In practice, a secondary current of about 0.1 to 3.0 milliamperes per square centimeter to the cathode has been satisfactory for a fuel cell assembly which will readily generate 60 to 500 milliamperes per square centimeter wtih a powder output of 0.7 to 0.8 volt at 100 milliamperes per square centimeter.

The reactions taking place in a composite fuel cell are illustrated below:

$$C_2H_6 + 4H_2O \rightarrow 2CO_2 + 14H^+ + 14e^- \text{ (anode)}$$
$$14H^+ + 14e^- \rightarrow 7H_2 \text{ (cathode)}$$
$$7H_2 + 14OH^- \rightarrow 7H_2O + 14e^- \text{ (fuel cell anode)}$$
$$7H_2O + 3\tfrac{1}{2}O_2 + 14e^- \rightarrow 14OH^- \text{ (fuel cell cathode)}$$

The fuel cell anode is connected in as a cathode to the secondary power supply desirably to compensate for hydrogen loss therein caused by impurities and to complete the internal circuit between the fuel cell cathode and hydrocarbon cell anode. As an alternative to supplying electrons to the converter cathode, it is possible to compensate for the hydrogen loss in the system by providing the secondary circuit across the fuel cell anode and cathode with the fuel cell anode acting as the cathode of the secondary circuit, thus producing a reduction in the demand for hydrogen albeit with a somewhat lesser cell output to the load, since only small currents are required.

To utilize the fuel cell output as a source of current for the secondary circuit, a multiplicity of fuel cell assemblies are connected in series and the current for all but the first or most negative cell is shunted thereto through suitable resistance. However, the first or most electronegative cell in the series will still require a source other than the cell series. An independent fuel cell can readily function to provide the current for the secondary circuit for the most negative cell in a large number of fuel cell assemblies.

Bacon-type cathodes using dual layers of porous nickel are conveniently utilized in the fuel cell and are illustrated and described in detail in Bacon United States Patent No. 2,928,783 and, as pointed out therein, the oxygen cathode should be oxidized to produce a corrosion-resistant coating. The fine pore layer prevents the gases from bubbling into the electrolyte and the gases on the opposite side prevent the electrolyte from penetrating through the large pore layer. Catalysts are deposited in the porous layers to catalyze the reactions occurring thereat.

Generally, the conversion cells and fuel cell assemblies of the present invention are operated at a temperature of 25 to 250° centigrade, and preferably 130 to 170° centigrade. The pressures employed may vary between about 1.0 to 5.0 atmospheres and are preferably about 1.0 to 1.6 atmospheres.

Thus, in a combination of the converter with a fuel cell, there can be provided a relatively compact assembly which will directly utilize the hydrogen produced by the converter portion of the assembly. Since the external circuit through the load is coupled between the anode of the hydrocarbon converter and the cathode of the fuel cell, the present invention provides a means for reliably compensating for the loss of hydrogen in the system to prevent deterioration thereof. The secondary power source to provide this compensation may be connected from the cathode of the hydrocarbon conversion cell or the anode member of the fuel cell to the anode of the hydrocarbon conversion cell or the cathode member of the fuel cell. The selected one of the cathode and anode member is the cathode in the secondary circuit to provide compensation for the loss of hydrogen in the cell assembly either by producing increased hydrogen in the conversion portion through the coupling of the hydrocarbon anode and cathode or by diminishing the output of the cell through the external load and thereby the requirements through the coupling of the fuel cell cathode into the secondary circuit as an anode.

Figure 2:
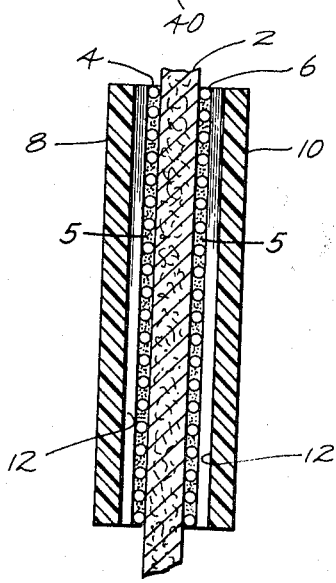
FIGURE 2 is an enlarged diagrammatic representation of the electrode assembly portion of the apparatus of FIGURE 1.

Referring now in detail to the attached drawing, illustrated in FIGURE 1 is a reformer cell embodying the present invention and employing an electrode assembly which is best understood by reference to FIGURE 2. A porous matrix member 2 saturated with electrolyte has on its sides an anode 4 formed by a conductive wire screen pasted with a dehydrogenation catalyst 5 and a cathode 6 formed by a conductive wire screen pasted with a catalyst. Pressure plates 8, 10 of synthetic resin having longitudinal grooves 12, formed therein are disposed against the outer surfaces of the electrodes 4, 6 to hold them firmly against the matrix member 2 and to permit the reactant gases to travel into contact therewith and the product gases to escape therefrom.

The electrode assembly of FIGURE 2 is assembled within the housing shown in FIGURE 1 and comprised of the metal body plates 14, 16 which are secured together by threaded fasteners such as bolts (not shown) and which are provided with metal fittings 18, 20, 22 and 24 adjacent the ends of the electrode assembly which seat tubes 26 of synthetic resin. Disposed outwardly of the pressure plates 8, 10 are plates 28, 30 of synthetic resin having apertures 32 cooperating with the fittings 18, 20, 22 and 24, and the electrode assembly is received in apertures formed in the end plates 34, 36 and spacer plates 40, all fabricated from synthetic resin. As can be seen in the illustration of FIGURE 1, the matrix member 2 is of longer length than the electrodes 4, 6 and the apertures in the end plates 34, 36 are larger than the pressure plates 8, 10 so as to provide chambers 42, 44, 46 and 48 at the ends of the electrodes 4, 6 which in turn communicate with the tubes 26 through the apertures 32. Electrical leads 50, 52 to the electrodes 4, 6 extend through the end plates 34, 36 to complete an electrical circuit therebetween from a source of current (not shown).

In the operation of this embodiment, a mixture of gaseous hydrocarbon and steam are fed into the tube 26 of the fitting 18 and pass into the chamber 42 when they travel through the grooves 12 of the pressure plate 8 along the surface of the anode 4 in contact with the catalyst therein. Under the influence of the catalyst and the current, a reaction takes place in which the hydrocarbon and steam are converted into hydrogen ions and carbon dioxide. Unreacted hydrocarbon and steam as well as the product carbon dioxide then pass through the grooves 12 into the chamber 44 and outwardly through the tube 26 in the fitting 20 while the hydrogen ion generated by the reaction and some moisture vapor pass through the matrix member 2 and into contact with the catalyst of the electrically connected cathode 4 where it picks up electrons to form molecular hydrogen. The product hydrogen gas then travels in the grooves 12 of the pressure plate 10 to the chambers 46, 48 at the ends thereof and thence outwardly through the tubes 26 in the fittings 22, 24 to a suitable conduit either for immediate use in a fuel cell or the like or to a collector for future use.

Figure 3:
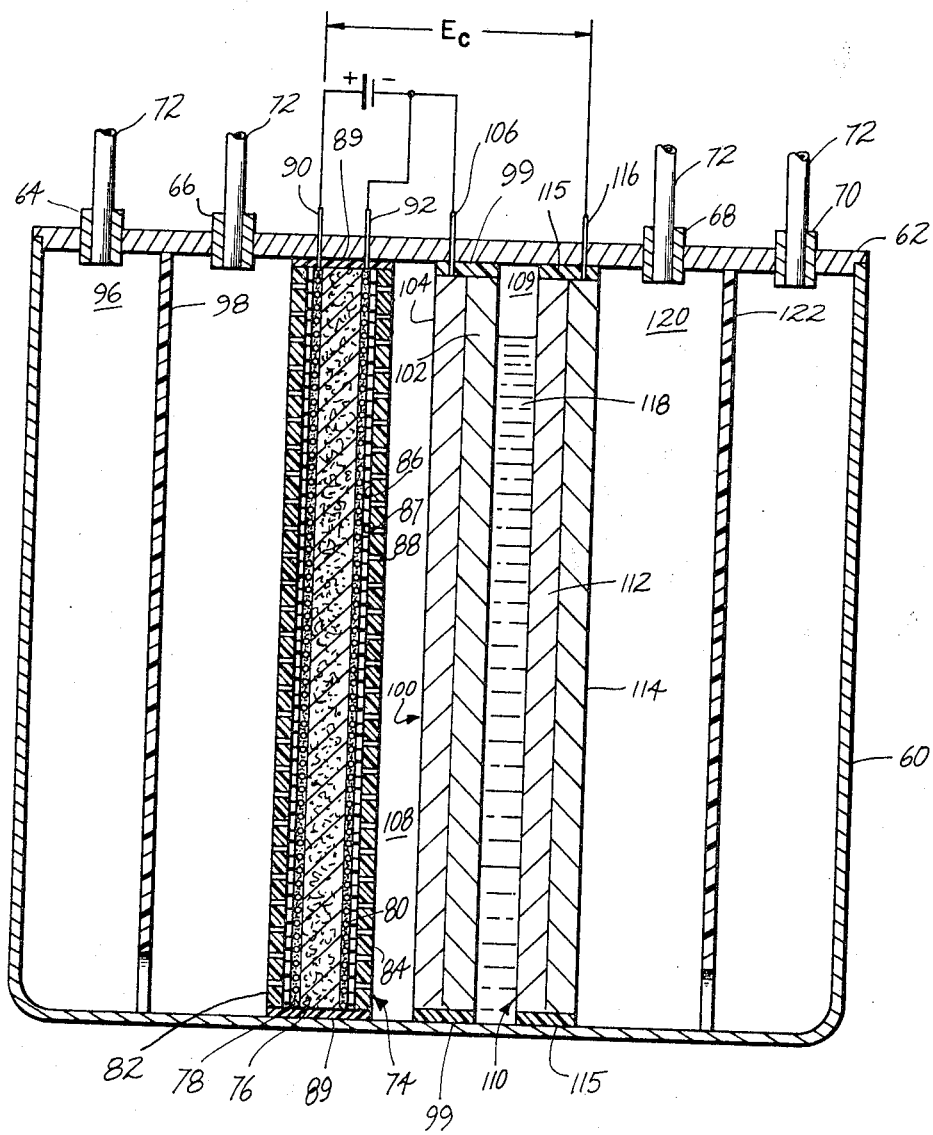
FIGURE 3 is a diagrammatic representation of an integrated fuel cell assembly embodying an electrolytic conversion apparatus in accordance with the present invention.

Referring now to the embodiment of FIGURE 3, therein is shown a converter-fuel cell assembly having a housing 60 with a top plate 62 provided with fittings 64, 66, 68 and 70 which seat tubes 72 of synthetic plastic material. An electrode assembly generally similar to that of FIGURES 1 and 2 is shown to the left hand side of the illustration and is generally designated by the numeral 74. As in the previous embodiment, there is a porous matrix member 76 having a wire screen anode 78 pasted with a dehydrogenation catalyst and a screen cathode 80 pasted with a catalyst. The screen anode 78 and screen cathode 80 are held against the matrix member 76 by pressure plates 82, 84 which in this embodiment are provided not only with vertical grooves 86 but also with horizontal grooves 87 and apertures 88 extending through the thickness thereof to permit flow of electrolyte and/or gas therethrough. The electrodes 78, 80 are insulated from the housing 60 by the spacers 89 and are connected to the leads 90, 92 for passage of current therethrough from a suitable power supply. A baffle plate 98 which is apertured at its lower end is disposed between the fittings 64, 66 to produce flow across the anode 78 and thence outwardly of the fitting 64.

Spaced to the opposite side of the cathode 80 and insulated from the housing 60 by the spacers 99 is a porous electrode generally designated by the numeral 100 and comprised of a fine pore layer 102 and a coarse pore layer 104 with a catalyst impregnated therein. The fine pore layer may be either a conductor or a non-conductor, but the coarse pore layer 104 is electrically conductive and has the lead 106 connected thereto. In this manner, the electrode 100 is internally electrically connected to the hydrocarbon cathode 80 and thereby to the hydrocarbon anode 78 by means of the secondary circuit into which it is coupled. The spacing between the electrode assembly 74 and the electrode 100 provides a compartment 108 which is free from electrolyte as will be more fully explained hereinafter.

Spaced from the electrode 100 to define a compartment 109 therebetween is a similarly constructed porous electrode generally designated by the numeral 110 and comprised of a fine pore layer 112 and a coarse pore layer 114 impregnated with a catalyst. Insulating spacers 115 and a lead 116 connected to the coarse pore layer 114 are also provided, and an alkaline electrolyte 118 is provided in compartment 109 between the electrodes 100, 110. The compartment 120 defined by the electrode 100 and the housing 60 is divided by a baffle plate 122 apertured at its bottom end and disposed between the fittings 68 and 70.

In the operation of this embodiment, a gaseous mixture of hydrocarbon and steam is introduced into the compartment 96 through the tube 72 in the fitting 66 and passes into contact with the anode 78 through the grooves 86 and 87 and the apertures 88 where it reacts under the influence of the current and catalyst to form hydrogen ion and carbon dioxide. The unreacted steam and hydrocarbon as well as the carbon dioxide reaction product then pass through the apertured baffle plate 98 and outwardly through the tube 72 in the fitting 64. The hydrogen ion passes through the electrolyte in the matrix member 76 into contact with the cathode 80 where it picks up electrons and becomes molecular hydrogen filling the compartment 108.

As the molecular hydrogen contacts the catalytic coarse pore layer 104 of the electrode 100, it gives up electrons and passes through the fine pore layer 102 and into the electrolyte 118. The hydrogen ions react with the hydroxyl ions formed at the electrode 110 by the oxygen in the air being fed in through the tube 72 of the fitting 68 which passes into the pores of the catalytically active coarse pore layer 114, thus forming water. Moisture vapor and unreacted air pass through the apertures in the baffle plate 122 and outwardly through the tube 72 in the fitting 70. Water collecting in the compartment 112 is removed through a valved drain (not shown).

A small potential is applied between the anode and cathode of the electrode assembly 74 to enhance the conversion of the hydrogen to hydrogen gas which acts as the fuel for the fuel cell. The reaction which takes place between the hydrogen produced by the conversion and the oxygen in the air in the electrolyte 118 of the fuel cell produces far more current than is required for the conversion of the hydrocarbon. The current applied across the electrodes of the conversion electrode assembly 74 is most conveniently supplied from a secondary source such as a small battery or other device. However, a multiplicity of fuel cell assemblies may be connected in series and the current for all but the first or most negative cell may derive their power through a shunt from a suitable resistance applied between the cells with the first or most negative cell still requiring a secondary source.

Thus, the electrolyte required for the hydrocarbon conversion is retained within its own compartment 96 and the alkaline electrolyte required for the fuel cell reaction is maintained within its own compartment 109 between the electrodes 100, 110. A compact and efficient assembly is provided wherein the hydrogen in relatively pure form is generated efficiently from a gaseous hydrocarbon or other hydrogen-containing fuel and is directly passed into the hydrox electrolyte to produce energy in excess of that required for the conversion of the hydrocarbon.

Illustrative of the operation of the present invention is the data set forth in the following specific examples:

EXAMPLE 1

A cell housing of tetrafluoroethylene material substantially as shown in FIGURE 1 is provided and has an electrode area of 5 centimeters x 5 centimeters. The matrix member is a mat of quartz fibers 30 mils in thickness and of approximately 60 percent porosity which is presaturated with an 85 percent by weight solution of phosphoric acid.

The anode is provided by a 50 mesh tantalum screen woven from wires of 3 mils thickness and 5 centimeters x 5 centimeters in dimension pasted with a mixture providing 25 milligrams per square centimeter of platinum-black and 10 milligrams per square centimeter of tetrafluoroethylene resin and thereafter sintered at 200° centigrade. The cathode is provided by a similar tantalum screen pasted with a mixture providing 1.0 milligram per square centimeter of platinum and 0.3 milligram per square centimeter of tetrafluoroethylene resin which is similarly sintered.

The feed stock to the conversion cell comprises a gaseous mixture of moisture vapor at a partial pressure of 0.8 atmosphere and ethane at a partial pressure of 0.2 atmosphere. The cell is maintained at a temperature of 150° centigrade and the voltage applied across the anode and cathode is 0.35 volt at 50 milliamperes per square centimeter.

The flow of gaseous mixture to the cell is adjusted to produce a 50 percent hydrocarbon conversion at the specified potential. Extracted from the cell is a hydrogen-vapor mixture in a ratio of 40:60 at atmospheric pressure. The flow of the hydrogen vapor mixture produced by the cell is 30 to 40 cubic centimeters per minute.

EXAMPLE 2

A cell is prepared substantially as illustrated in FIGURE 3 of the attached drawing with a hydrocarbon anode assembly as described in Example 1. The electrodes for the fuel cell portion are provided by Bacon-type electrodes formed of porous nickel with the hydrogen anode being impregnated with a 7.0 percent by weight solution of nickel nitrate and the oxygen cathode having been impregnated with a 7.0 percent by weight solution of cobalt nitrate. The oxygen cathode is subsequently oxidized at 540° centigrade for forty minutes.

In this embodiment, all electrodes have an active surface dimension of 5 centimeters x 5 centimeters and the matrix member of the hydrocarbon electrode is presaturated with a solution of 85.0 percent by weight phosphoric acid, no additional electrolyte being provided in the hydrocarbon compartment. A 65.0 percent by weight solution of potassium hydroxide is placed in the compartment between the fuel cell electrodes as the electrolyte for the redox reaction.

A gaseous mixture of ethane and water vapor is fed into the anode side of the hydrocarbon electrode with a hydrocarbon partial pressure of 0.32 atmosphere and a water vapor partial pressure of 1.28 atmospheres. The feed is at a temperature of 150° centigrade, at which temperature the cell is maintained. Air at 150° centigrade and at a pressure of 1.6 atmospheres is fed into the oxygen cathode side of the unit.

The potential applied between the anode and cathode of the hydrocarbon electrode is 0.35 volt at 50 milliamperes per square centimeter and the voltage produced by the redox reaction is 0.95 volt at 50 milliamperes per square centimeter.

Thus, it can be seen from the foregoing detailed specification and examples that the present invention provides a novel apparatus and method for converting a hydrogen-containing feedstock into hydrogen under the influence of a dehydrogenation catalyst and potential, and the apparatus and method for such conversion may be readily combined with a conventional fuel cell reaction to provide an integrated fuel cell assembly capable of operating efficiently and with relative freedom from difficulties. The conversion cell may be assembled rapidly and is adapted to production of a compact unit which is relatively economical to fabricate and trouble free in operation.

Having thus described the invention, I claim:

1. In a fuel cell assembly, the combination comprising a housing; a matrix member formed of absorbent porous material within said housing; an acid electrolyte in said matrix member and providing an ionic path therethrough; an anode firmly pressed against one side of said matrix member, said anode being porous and having a dehydrogenation catalyst in the pores thereof; a cathode firmly pressed against the other side of said matrix member, said cathode being permeable to hydrogen and providing a catalyst for absorption of hydrogen ion and reduction thereof; means in said housing for directing a gaseous hydrogen-containing feedstock into contact with said dehydrogenation catalyst of said anode to produce hydrogen and for discharging the unreacted portion of said stream and reaction products from adjacent said anode; means in said housing for collecting and discharging hydrogen permeating through said cathode, said housing, matrix member, cathode and anode being cooperatively dimensioned and configured to prevent the gaseous reactant stream from flowing from the anode side to the cathode side of said housing; a fuel cell anode member spaced from said cathode to the side thereof opposite from said matrix member; a fuel cell cathode member spaced from said fuel cell anode to the side thereof opposite from said fuel anode member; an electrolyte between said fuel cell cathode and anode members; electrical leads to said anode, cathode, anode member and cathode member, said cathode and anode member being electrically coupled and said anode and cathode member being connected in an external circuit through a load to provide current flow therebetween as the result of the oxidation-reduction reactions occurring thereat; and a secondary power source connected from one of said anode members and said cathode to said cathode member and said anode with said anode member and cathode being the cathode in the secondary circuit provided by said secondary power source to compensate for hydrogen loss in the cell assembly.

2. The combination of claim 1 wherein said anode is provided by a multiplicity of conductive wires forming a screen with said dehydrogenation catalyst being disposed therebetween.

3. The combination of claim 1 wherein said housing includes a pair of members holding said anode and cathode firmly against said matrix member, said holding members having flow paths therein for movement of gas about the surface of said anode and cathode.

4. A fuel cell assembly comprising a housing; a matrix member formed of absorbent porous material within said housing; an acid electrolyte in said matrix member and providing an ionic path therethrough; an anode firmly pressed against one side of said matrix member, said anode providing a dehydrogenation catalyst and being permeable to hydrogen ion; a cathode firmly pressed against the other side of said matrix member, said cathode being permeable to hydrogen ion and providing a catalyst for adsorption of hydrogen ion and reduction thereof; a fuel cell anode member spaced from said cathode to the side thereof opposite from said matrix member; a fuel cell cathode member spaced from said fuel cell anode to the side thereof opposite from said anode member; an electrolyte between said fuel cell cathode and anode members; electrical leads to said anode, cathode, anode member and cathode member, said cathode and anode member being electrically coupled and said anode and cathode member being connected in an external circuit through a load to provide current flow therebetween as the result of the oxidation-reduction reactions occurring thereat; and a secondary power source connected from said anode member and said cathode to one of said cathode member and said anode with said anode member and cathode being the cathode in the secondary circuit provided by said secondary power source to compensate for hydrogen loss in the cell assembly.

5. The fuel cell assembly in accordance with claim 4 wherein said matrix member is formed of a mat of inorganic fibers substantially inert to said electrolyte and to electrical current passing therethrough.

6. The fuel cell assembly in accordance with claim 4 wherein said anode is provided by a multiplicity of conductive wires forming a screen with a dehydrogenation catalyst therebetween.

7. The fuel cell assembly in accordance with claim 4 wherein said anode and cathode are connected to said power source.

8. A fuel cell assembly comprising a housing; a matrix member formed of absorbent porous material within said housing; an acid electrolyte in said matrix member and providing an ionic path therethrough; an anode provided by a multiplicity of conductive wires forming a screen with a dehydrogenation catalyst therebetween, said anode being firmly pressed against one side of said matrix member; a cathode firmly pressed against the other side of said matrix member, said cathode being formed of a multiplicity of metal wires forming a screen and providing a catalyst therebetween for adsorption of hydrogen ion and reduction thereof; a fuel cell anode member spaced from said cathode to the opposite side thereof from said matrix member; a fuel cell cathode member spaced from said fuel cell anode to the opposite side thereof from said cathode; an electrolyte between said fuel cell cathode and anode members; electrical leads to said anode, cathode, anode member and cathode member, said cathode and anode member being electrically coupled and said anode and cathode member being connected in an external circuit through a load to provide current flow therebetween as a result of the oxidation-reduction reactions occurring between the fuel cell electrodes; and a secondary power source connected between said anode and cathode to compensate for hydrogen loss in the cell assembly, said housing providing means for directing a gaseous reactant stream including a gaseous hydrogen-containing component into contact with said anode and said dehydrogenation catalyst therein to produce hydrogen and for discharging the unreacted portion of said stream and reaction products from adjacent said anode, said housing having means for directing an oxygen-containing stream into contact with said cathode member, said housing and said anode and matrix member being cooperatively dimensioned and configured to prevent a gaseous reactant stream from flowing into contact with said cathode and anode member.

9. In a method for electrochemically producing electrical energy, the steps comprising passing a gaseous mixture including a hydrogen-containing feedstock into contact with an anode providing a dehydrogenation catalyst to produce hydrogen ions therefrom; causing said hydrogen ions to pass into an absorbent porous matrix member saturated with an electrolyte and therethrough to a cathode providing a catalyst for the adsorption of hydrogen ion and reduction thereof by flowing a current between said anode and cathode from an external source of current; passing the hydrogen from said cathode to the anode member of a fuel cell in contact with an alkaline electrolyte and spaced from a cathode member of the fuel cell; providing an electrical connection between said cathode and anode member; passing oxygen into contact with said cathode member to produce hydroxyl ions at said cathode member in said alkaline electrolyte; and coupling said anode and cathode member through an external circuit providing a load to cause oxidation of the hydrogen diffusing said anode member of the fuel cell and to convert the energy of the chemical reaction to electrical energy, the current from the external source of current compensating for loss of hydrogen in the system.

10. The method of claim 9 wherein said mixture is comprised of a hydrocarbon and water vapor.

References Cited

UNITED STATES PATENTS

| | | | |
|---|---|---|---|
| 2,928,783 | 3/1960 | Bacon | 136—86 X |
| 3,124,520 | 3/1964 | Juda | 204—129 X |
| 3,180,813 | 4/1965 | Wasp et al. | 204—129 |
| 3,259,523 | 7/1966 | Faris et al. | 136—86 |
| 3,259,524 | 7/1966 | Fay et al. | 136—86 |
| 3,291,643 | 12/1966 | Oswin et al. | 136—86 |
| 3,305,403 | 2/1967 | Corso et al. | 136—86 X |

FOREIGN PATENTS

| | | |
|---|---|---|
| 1,383,637 | 12/1964 | France. |
| 1,051,820 | 3/1959 | Germany. |
| 871,950 | 10/1959 | Great Britain. |

ALLEN B. CURTIS, *Primary Examiner.*

U.S. Cl. X.R.

204—1